Feb. 10, 1948. H. L. RAWLINS 2,435,844
CIRCUIT INTERRUPTER
Filed May 27, 1943 3 Sheets-Sheet 1
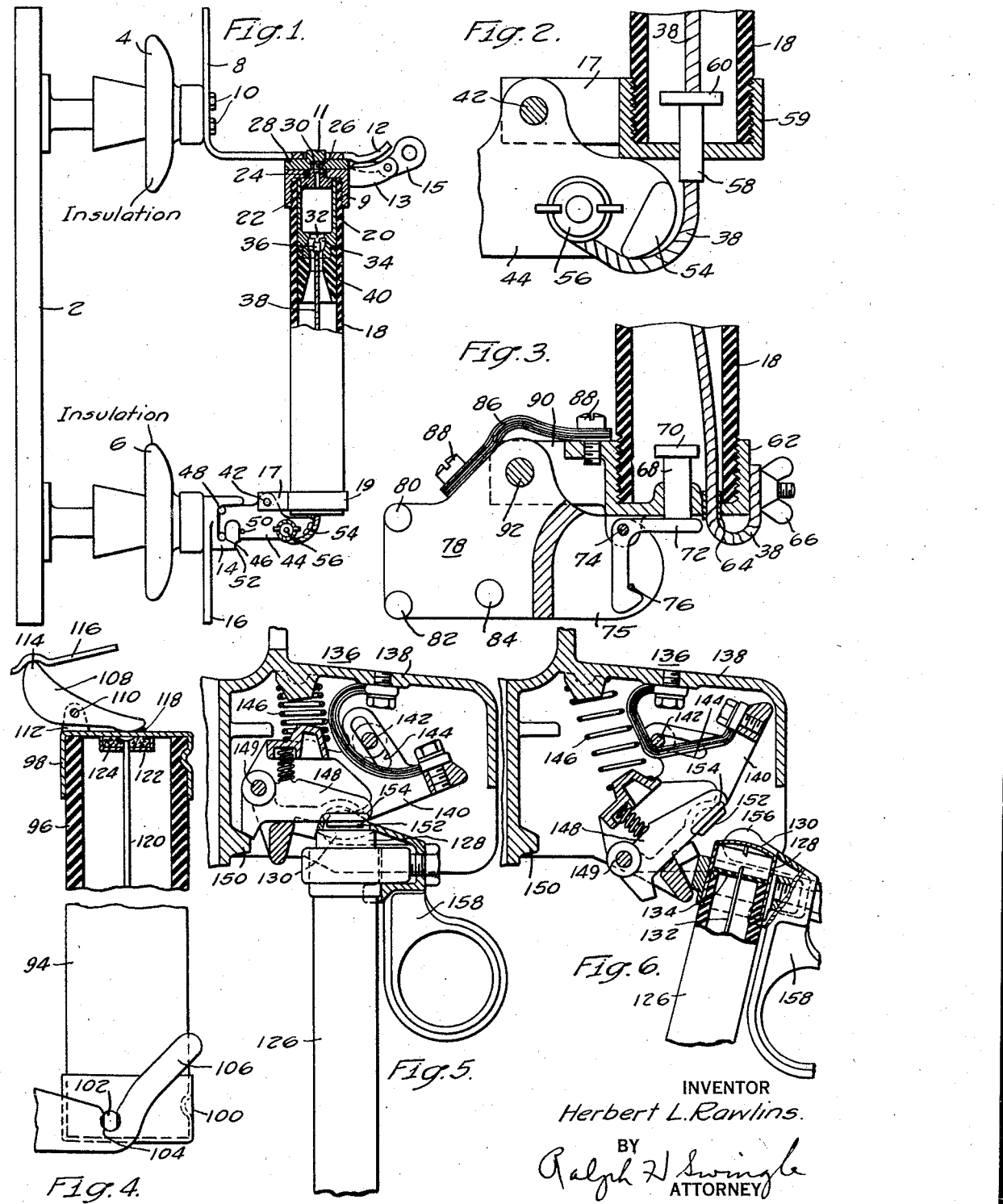
INVENTOR
Herbert L. Rawlins.
BY
Ralph H Swingle
ATTORNEY Feb. 10, 1948.   H. L. RAWLINS   2,435,844
CIRCUIT INTERRUPTER
Filed May 27, 1943   3 Sheets-Sheet 2
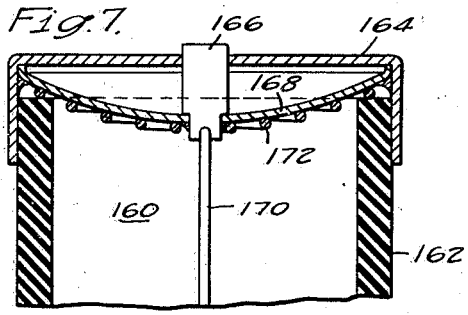
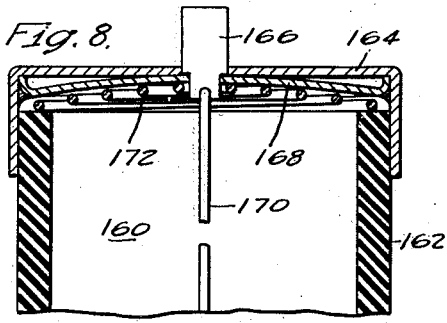
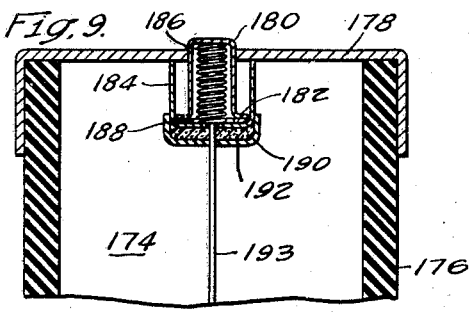
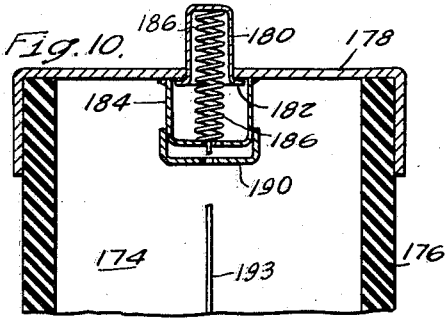
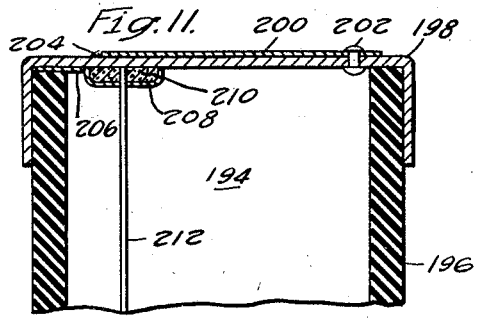
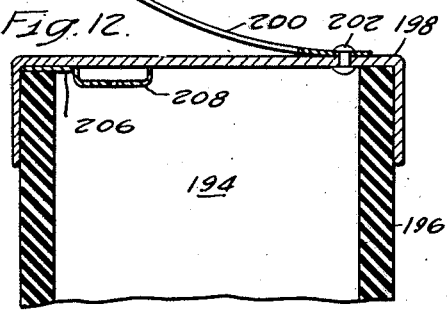
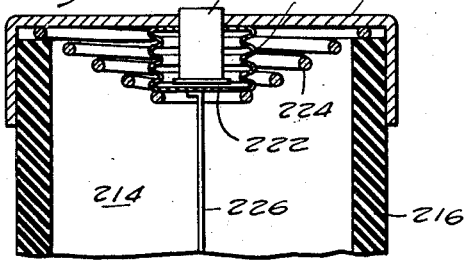
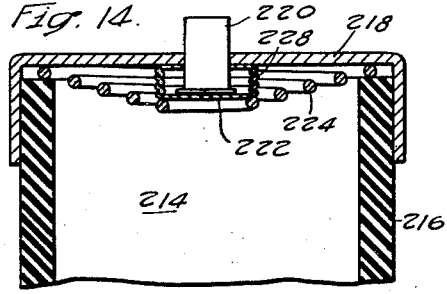
WITNESSES:
E. A. McCloskey
Q. T. Stratton
INVENTOR
Herbert L. Rawlins.
BY
Ralph H. Swingle
ATTORNEY Feb. 10, 1948.  H. L. RAWLINS  2,435,844
CIRCUIT INTERRUPTER
Filed May 27, 1943  3 Sheets-Sheet 3
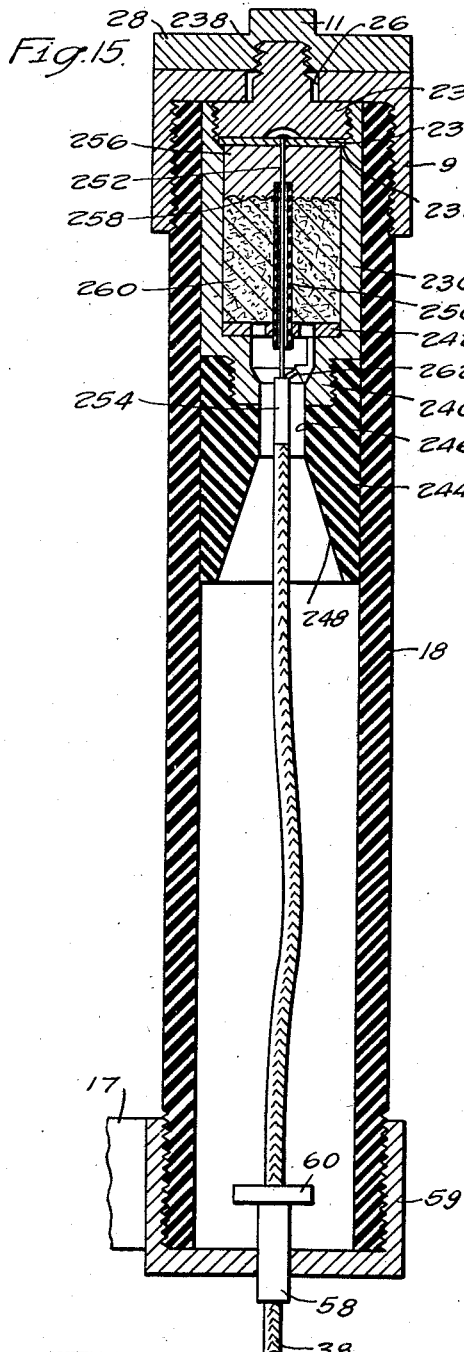
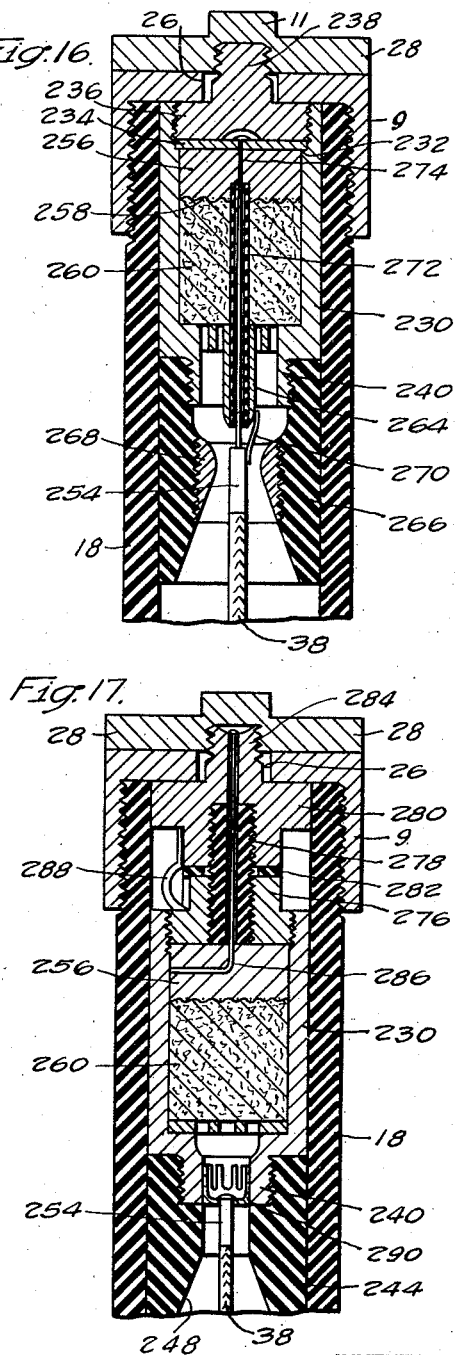
WITNESSES:
E. A. McCloskey
A. T. Stratton
INVENTOR
Herbert L. Rawlins.
BY Ralph W. Swingle
ATTORNEY Patented Feb. 10, 1948

2,435,844

UNITED STATES PATENT OFFICE 2,435,844

CIRCUIT INTERRUPTER

Herbert L. Rawlins, Pittsburgh, Pa., assignor to Westinghouse Electric Corporation, East Pittsburgh, Pa., a corporation of Pennsylvania Application May 27, 1943, Serial No. 488,621

23 Claims. (Cl. 200—114)

This invention relates generally to electric circuit interrupters, and more specifically to high-voltage fuses of the dropout or indicating types.

This invention constitutes a continuation-in-part of the subject-matter of my copending application Serial No. 319,896, filed February 20, 1940, on Gas blast circuit interrupters, now Patent No. 2,343,422, issued March 7, 1944, and assigned to the same assignee of this invention.

High-voltage fuses are used in many locations where it is necessary that they be entirely enclosed so that there is no external display when the fuse blows, and so that they are completely protected from the surrounding atmosphere. It is also desirable in many such instances that the fuse be mounted so as to automatically drop out of the circuit after blowing to introduce an air gap and to give a readily visible indication of the blown condition. For certain purposes, it may suffice merely to provide an indication of the blown condition of the fuse, where it is not necessary or desirable to introduce an air gap in the circuit.

Accordingly, one object of this invention is to provide a totally enclosed dropout fuse which remains totally enclosed during and after blowing of the fuse and movement of the fuse out of the circuit.

Another object of this invention is to provide a novel type of dropout fuse wherein a predetermined fluid pressure is generated by the arc formed when the fuse blows irrespective of the current value of the arc, and this pressure causes the dropout action of the fuse.

Another object of this invention is to provide a novel totally enclosed fuse construction having means movable outwardly relative to the fuse to a projecting position in response to blowing of the fuse, without opening the fuse enclosure to the atmosphere.

Another object of this invention is to provide a novel totally enclosed fuse construction having means mechanically movable outwardly to a projecting position with respect to the fuse in response to blowing of the fuse, without opening the fuse enclosure to the atmosphere. Another object of this invention is to provide a fuse with novel means biased outwardly of the fuse for movement relative to the fuse tube without opening the tube to atmosphere, which means is normally restrained by the fusible means so that it moves outwardly in response to blowing of the fuse.

Another object of this invention is to provide a fuse of the type described wherein a movable means outwardly biased with respect to the fuse tube is normally restrained by a mechanical connection which is rendered ineffective upon blowing of the fuse.

These and other objects of this invention will become more apparent from the following description of preferred embodiments thereof, when taken in connection with the accompanying drawings, in which:

Figure 1 is a side elevation view illustrating one embodiment of the invention, with part of the fuse shown in section;

Fig. 2 is a partial sectional view of the lower end of a fuse like that shown in Fig. 1 but illustrating a modified construction of this part of the fuse;

Fig. 3 is a view similar to Fig. 2, but showing another modified construction;

Fig. 4 is an elevational view of a modified fuse and support, with the upper end of the fuse in section;

Fig. 5 is an elevational view of the upper end of a modified form of fuse, with the upper contact construction and part of the fuse structure being in section;

Fig. 6 is a view of the construction shown in Fig. 5, with the upper end of the fuse shown in section and with the parts in a different position;

Fig. 7 is a section of the upper end of a modified form of fuse;

Fig. 8 is a section of the upper end of the fuse shown in Fig. 7, with the parts in the position they assume when the fuse has blown;

Fig. 9 is a section of the upper end of another modified form of fuse;

Fig. 10 is a section of the upper end of the fuse shown in Fig. 9, with the parts in the position they assume when the fuse has blown;

Fig. 11 is a sectional view of the upper end of another modified form of fuse;

Fig. 12 is a section of the upper end of the fuse shown in Fig. 11, with the parts shown in the position they assume when the fuse has blown;

Fig. 13 is a section of the upper end of still another modified form of fuse;

Fig. 14 is a section of the upper end of the fuse shown in Fig. 13, but with the parts shown in the position they assume when the fuse has blown;

Fig. 15 is a longitudinal sectional view of still another modified form of fuse, capable of being mounted in a manner similar to the fuse shown in Fig. 2;

Fig. 16 is a longitudinal section of the upper end of a fuse similar to that shown in Fig. 15, but slightly modified in form; and Fig. 17 is a longitudinal section of the upper end of a fuse similar to those shown in Figs. 15 and 16, but illustrating still another modification of the invention.

In Fig. 1, there is illustrated a mounting for a fuse which may be utilized for supporting any desired type of fuse. This mounting is designed so that, upon blowing of the fuse, the fuse tube terminals are released from engagement with respect to at least one line contact, and the fuse tube proper is supported so that it is movable in response to blowing of the fuse to move at least one of its terminals out of engagement with respect to at least one of the line contacts.

As shown in Fig. 1, a pair of insulators 4 and 6 are secured in spaced relation on a supporting member 2. The upper insulator 4 is provided with a substantially L-shaped resilient contact and terminal 8, one leg of which is secured to the cap of insulator 4, as by the machine screws 10, and the other leg of which extends substantially horizontally and is provided with an aperture for receiving a projection 11 on the upper end of the fuse. The outer end of the horizontal leg of terminal member 8 is upwardly turned as at 12, for a purpose to be described. The fuse is provided with a tubular enclosure 18 of any desired insulating material, such, for example, as fiber, porcelain or the like. The fuse tube is provided with a terminal cap 9 at the upper end thereof and with a terminal ferrule 19 at the lower end thereof. The upper fuse terminal cap may be provided with a pair of outwardly extending spaced supporting arms 13 for pivotally supporting therebetween a release lever 15. The lever 15 is apertured, as shown, for the insertion of a hookstick or other operating member, and, as appears from Fig. 1, is adapted to release the upper end of the fuse from contact member 8 when the lever 15 is rotated in a clockwise direction about its pivot. Such movement of release lever 15 acts to raise the outer end 12 of contact 8 out of engagement with projection 11 on the upper fuse terminal cap 9. With the fuse pivotally mounted at its lower end, it is obvious that the fuse may be moved in a generally counter-clockwise direction when at an open circuit position to become reenegaged with contact member 8, since the projection 11 on the fuse will engage with the outer upturned end 12 of the contact 8 and cam the same upwardly, to permit the projection 11 to ride along the undersurface of contact 8 until it becomes aligned with the aperture therein, when it will be latched in the position shown in Fig. 1. The vertical arm of contact 8 may serve as a terminal portion for the connection of a line conductor thereto.

The lower fuse terminal ferrule 19 is provided with a pair of spaced and inwardly extending arms 17 for pivotally supporting therebetween, as by a pivot pin 42, an intermediate portion of a supporting lever 64. The inner end of lever 44 is provided with lower opposed trunnions 46 adapted to be received in notches provided in the sides of a split contact member 14 secured to the outer end of lower insulator 6. Contact 14 is provided with an integral downwardly extending terminal portion 16 for connection of a line conductor thereto. The inner end of lever 44 is also provided with upper opposed positioning lugs 48 adapted to properly position the lever with respect to contact 14, and also is provided with intermediate stop lugs 50 adapted to engage concave stop portions 52 provided on the contact, as will be hereinafter described. A flexible conductor 38, forming part of the circuit through the fuse, is adapted to extend out of the lower end of the fuse tube and over a lateral projection 54 on the outer end of supporting lever 44 to be secured to the lever, as by a thumb nut 56.

As previously stated, any desired type of fuse may be supported in engagement with a pair of line contacts by the means described above. However, the fuse illustrated in Fig. 1 is of the type which utilizes a source of compressed gas which is released upon blowing of the fuse, and the released gases are directed through the arc formed to extinguish the same. This fuse construction is more particularly described and claimed in my copending application referred to above.

In this fuse construction, a tubular member 20 is provided within fuse tube 18 adjacent the upper end thereof, and has an end plug 22 secured in the upper end thereof, as by welding, brazing or the like. The end closure plug 22 is provided with a reduced projection 24 for extension through the opening 26 in upper fuse terminal cap 9 to cooperate with a clamping disc 28 for securing this refill unit in operative position within fuse tube 18. End closure plug 22 is provided with a substantially central bore extending to the outer end of projection 24, and the bore may be sealed by the threaded sealing plug 30. The lower end of tubular member 20 is provided with an aperture which is closed by a fusible plug 32. Fusible plug 32 is, in turn, connected by a short calibrated fusible section 34 to a sleeve 36 on the upper end of flexible conductor 38. Tubular member 20 is provided with an insulating throat member 40 to provide a restricted or a Venturi gas passage through which gases released from tubular member 20 pass upon melting of fusible plug 32. Tubular member 20 is adapted to be filled with a gas under pressure, such, for example, as air or the like, and then sealed by plug 30.

In operation, when the current through the fuse exceeds a predetermined value, the fusible section 34 melts and an arc is struck to the fusible plug 32. Plug 32 will, in turn, melt and thereby provide an opening in the lower end of tubular member 20 through which the stored compressed gas may escape. When the fusible section 34 and plug 32 melt, an arc is struck from the adjacent portion of tubular member 20 to the sleeve 36 on flexible conductor 38. Obviously, gases escaping from the lower aperture in tubular member 20 will necessarily be directed through the arc drawn, and will also tend to expel flexible conductor 38 through the Venturi passage in insulating throat member 40. It should also be noted that, after the fuse has blown and interrupted the circuit, it may be renewed by removing the blown refill unit and inserting a new one, by merely removing clamping disc 28 to permit the refill unit to drop through the open end of the fuse tube. The new refill unit may be inserted through the open end of the fuse tube and secured in position by clamping disc 28. Thereafter the conductor 38 thereof may be secured to supporting lever 44 in the manner shown in Fig. 1.

When the fuse blows to interrupt the circuit as described above, flexible conductor 38 will be released within fuse tube 18, and accordingly will no longer support the outer end projection 54 of supporting lever 44. The fuse tube and lever are then freed for relative movement, and the fuse tube may drop downwardly under the influence of gravity and the force exerted by resilient contact 8, to disengage its upper projection 11 from contact member 8 before the downward movement of supporting lever 44 is stopped by engagement of the stop lugs 50 thereon with stop recesses 52 provided on contact 14. Fuse tube 18 is then free to rotate about pivots 42 and 46 in a clockwise direction outwardly and away from upper contact 8 to thereby introduce a large air gap in the circuit.

The release of flexible conductor 38 may be effected by the gas pressure developed within the fuse. However, to do this, the fuse should be of the type, such as that shown in Fig. 1, wherein a predetermined gas pressure is built up within the fuse whenever the fuse blows, which pressure is independent of the value of the current interrupted in order to obtain reliable operation. To obtain release by pressure, flexible conductor 38 may have secured thereto a relatively rigid piston-like member 58 (Fig. 2) proportioned to closely fit in an aperture in a terminal cap 59 secured to the lower end of fuse tube 18. The piston member 58 is preferably provided with an upper flange portion 60 within the fuse tube to limit downward movement thereof. It will be obvious that, with the construction shown in Fig. 2, the gas pressure developed within the fuse tube will positively move piston member 58, and consequently the lower end of flexible conductor 38, downwardly, to permit the fuse tube to be disengaged from its upper contact 8. The use of such a construction prevents possible fouling of the lower opening through which flexible conductor 38 extends, and positively insures movement of the conductor to release supporting lever 44 and permit the fuse to drop out of the circuit. Moreover, it will be observed that, with this construction, the fuse is entirely enclosed at all times, so as to be entirely protected from the atmosphere, and to prevent the emission of flame or ionized gases from the fuse to the atmosphere.

Fig. 3 illustrates a slightly modified form of connection between a supporting lever 78, generally similar to the supporting lever 44 described in connection with Figs. 1 and 2, and adapted to be supported on a contact, similar to the contact 14 of Fig. 1, but with the fuse being entirely enclosed at all times, as in the embodiment of the invention shown in Fig. 2. The fuse tube in this embodiment of the invention is provided with a lower terminal cap 62 having an eccentric or offset opening provided with a bushing 64, through which passes the lower end of flexible conductor 38 to be secured to terminal cap 62, as by a thumb nut 66. End cap 62 is provided with a central aperture for receiving a piston member 68 proportioned to relatively closely slidably fit within the aperture through terminal cap 62. Piston 68 is provided with a flange 70 within the fuse tube to limit downward movement of the piston. In the normal position of the fuse, the lower end of piston 68 is adapted to engage one arm of a bell-crank lever 72 pivoted as at 74 between spaced, depending supporting ears integral with fuse terminal cap 62. The other arm of bell-crank lever 72 is formed into a hook-shape at its outer end for engagement with a pin 76, extending between the sides 75 of the split outer end of supporting lever 78. Supporting lever 78, similar to the lever 44 previously described, is provided with positioning lugs 80, trunnions 82 and stop lugs 84 similar to the corresponding lugs and trunnions on lever 44. In addition, the lever 78 is electrically connected to fuse terminal cap 62 by a flexible shunt 86 secured to the lever and terminal cap, as by the screws 88. Lever 78 is mounted between spaced pivot supporting arms 90 integral with lower fuse terminal cap 62, as by the pivot pin 92.

In the operation of this embodiment of the invention, it is apparent that normally lever 78 is latched against movement relative to fuse tube 18, by a positive latching means 72, 76, which is independent of flexible conductor 38, and, therefore, independent of the fusible means within the fuse tube. Lever 78 and fuse tube 18 are released for relative movement upon blowing of the fuse solely by the gas pressure developed within the fuse tube acting upon piston member 68, which is moved outwardly thereby, to rotate bell-crank lever 72 in a clockwise direction about its pivot 74 out of latching engagement with respect to pin 76 on lever 78. The fuse tube may then drop down and out of the circuit as described in connection with the embodiment of the invention shown in Fig. 1.

The fuse structures shown in Figs. 2 and 3 provide totally enclosed fuse constructions which are adapted to drop out of their associated circuit, or disengage at least one terminal of the fuse from a line contact, to insert a relatively large air gap in the circuit. Furthermore, the dropout movement of such an enclosed dropout fuse is initiated by gas pressure developed within the fuse tube, or the gas pressure may be utilized to release a latch holding the parts in the circuit. Furthermore, this pressure utilized in the dropout operation in these improved fuse constructions is entirely independent of the value of the current interrupted, and hence may be of a predetermined value which will give efficient and reliable dropout operation under all conditions. The particular fuse construction illustrated in Fig. 1 provides a quantity of gas when the fuse blows which is predetermined by the amount of gas stored in container 20, and which quantity is independent of the current values interrupted by the fuse. Furthermore, this gas not only is used to extinguish and attenuate the arc drawn when the fuse blows, but is also used to build up a pressure within the fuse tube to reliably operate means for releasing the fuse from its associated circuit. Also, the source of gas and fusible portion of these fuse constructions are designed to be replaceable as a unit within a fuse tube, and to be releasably secured therein by relatively simple means.

In the embodiment of the invention illustrated in Fig. 4, a fuse 94 is provided comprising an insulating tubular enclosure 96 which may be of any desired insulating material, such as fiber, porcelain or the like. Terminal caps 98 and 100 are secured over the outer ends of fuse tube 96 in any desired manner, such, for example, as by crimping portions of the terminal cap into the material of the fuse tube. The lower terminal cap 100 is provided with oppositely extending flat-sided trunnions 102 for reception in keyhole slots 104 provided in spaced contact arms 106, which may in turn be supported on an insulator 6, similar to contact 14, as shown in Fig. 1.

A toggle lever 108 is pivotally supported on upper fuse terminal cap 98 by a pair of spaced supporting members 112 integral with the terminal cap, and carrying a pivot pin 110 at their outer ends for pivotally supporting toggle lever 108 therebetween. The toggle lever is provided at one end with a nose 114 adapted, in the closed circuit position of the fuse, to engage an indentation provided in a resilient contact member 116. Contact member 116 may be formed and supported on a line insulator in a manner similar to contact member 8, as shown in Fig. 1. Normally toggle lever 108 is prevented from rotating about pivot pin 110 by a low melting point solder 118 securing the other end of the lever to substantially the central portion of fuse terminal cap 98.

Within fuse tube 96 there is provided a conductor wire 120 secured, as by soldering or the like, to terminal caps 98 and 100 to complete the circuit within the fuse. For low current ratings, conductor 120 may be of fusible material so that it melts on overload. However, for high current ratings, conductor 120 may be arranged in parallel with a calibrated fusible member, as in my previously mentioned copending application. In either case, conductor 120 will fuse and strike an arc to upper terminal cap 98. A cup-shaped support 122 is secured to the inner side of terminal cap 98 for supporting in proximity to the end wall of the cap, over the area occupied by solder 118, heat-producing material 124. The material 124 may be any desired combustible material capable of producing a relatively large quantity of heat when ignited, such as Thermite or the like.

In the operation of the fuse shown in Fig. 4, it will be apparent that, upon an overload in the circuit, conductor 120 will melt and an arc will be struck in proximity to heat-producing material 124 to ignite this material, and thereby produce relatively large amounts of heat which will be conducted through the end wall of terminal cap 98 to melt solder 118, and release toggle lever 108 for movement about its pivot 110. Toggle lever 108 will be moved in a counterclockwise direction about its pivot 110 by the force exerted downwardly by resilient contact 116 acting on the nose 114 of toggle lever 108. This will not only cause counterclockwise movement of toggle lever 108 about its pivot 110, but will cause the pivot point to move to the right, as viewed in Fig. 4, and thus cause fuse 94 to rotate in a clockwise direction about its trunnions 102 and drop out of the circuit.

It will be observed that the fuse described above and shown in Fig. 4 of the drawings is entirely enclosed at all times, and is released for movement out of its associated circuit by heat conducted through one of its terminal caps from heat-generating means ignited in response to blowing of the fuse, to generate a predetermined quantity of heat within the fuse.

The fuse 126 illustrated in Figs. 5 and 6 of the drawings is adapted to be pivotally mounted at its lower end in a manner like the fuse shown in Fig. 4. Fuse 126 is provided with an upper terminal cap 128 secured to the upper end of the fuse tube, and this cap is provided with a flexible end wall 130 which normally does not extend above the side walls of the cap and preferably is concave in form, as shown in Fig. 5. A conductor 132 of fusible material, which may be connected in parallel with a fusible element like conductor 120 shown in Fig. 4, is connected to the central portion of flexible end wall 130 of the terminal cap, to normally maintain the wall in the concave form shown in Fig. 5. A disc 134, which may be of insulating material such as fiber or the like, is adapted to be seated on the outer end of the fuse tube and to confine between disc 134 and end wall 130 of the terminal cap, a predetermined charge of combustible explosive material, such, for example, as gunpowder or the like.

It will be apparent that, when conductor 132 melts to establish an arc in the space between disc 134 and end wall 130 of the upper fuse terminal cap, the explosive material will be ignited and will force end wall 130 to the convex form shown in Fig. 6, wherein it projects above the side walls of terminal cap 128. This will give a clearly visible indication of the blown condition of the fuse, and may be utilized to operate latch release means for causing the fuse to drop out of the circuit.

The fuse 126 may be used with an upper contact and latching mechanism 136 to enable the same to drop out of the circuit. This contact and latching mechanism is more particularly described and claimed in the copending application of H. L. Rawlins and John J. Mikos, Serial No. 428,710, filed January 29, 1942, now Patent No. 2,403,121, issued July 2, 1946, and assigned to the same assignee as this invention. Accordingly, for a more complete description of the construction and operation of the contact and latch mechanism 136, reference is hereby made to the aforesaid patent of Rawlins and Mikos. In general, this contact and latch mechanism is provided within a protective hood 138 adapted to be mounted on a line insulator, such as the insulator 4 shown in Fig. 1 of the drawings. Beneath hood 138 there is supported a contact latch lever 140 by means of a cross-pin 142 secured in hood 138, and received in a slot 144 provided in latch lever 140. A coiled compression spring 146 reacts between lever 140 and hood 138 to bias the lever in a generally counterclockwise direction about supporting pin 142. A release lever 148 is pivoted on latch lever 140 by a pivot pin 149, and the release lever is provided with an arm adapted to normally engage an abutment 150 integral with hood structure 138. Release lever 148 has a nose 152 overlying end wall 130 of fuse terminal cap 128. Lever 140, which is generally rectangular in form, has opposite sides thereof provided with notches 154 for receiving projections 156 provided on a fixture 158 secured to fuse terminal cap 128. The fixture 158 is provided with a hook-eye aperture, as shown, for manual manipulation of the fuse.

The operation of mechanism 136 upon blowing of fuse 126 will be, in general, that the reversal of curvature of flexible end wall 130 of terminal cap 128 will cause the end wall to engage release lever 148 and move it in a counterclockwise direction relative to latch lever 140, until the release lever disengages abutment 150 on hood 138. This will release spring 146 to cause counterclockwise pivoting of latch lever 140 relative to supporting pin 142, and move fuse 126 to the position shown in Fig. 6. When the fuse has attained the position shown in Fig. 6, it has sufficient kinetic energy, and is positioned so as to be acted upon by the force of gravity to move to a fully open circuit position entirely disconnected from at least one line contact. It will be observed that fuse 126 remains entirely enclosed at all times, and that dropout action is initiated by the bulging upwardly of end wall 130 of the upper fuse terminal cap 128.

In Figs. 7 and 8, there is illustrated a fuse 160 including a fuse tube 162 of insulating material adapted to have both ends thereof closed. The lower end of fuse tube 162 may be closed by a terminal cap similar to the cap 100 shown in Fig. 4. The upper end of fuse tube 162 is provided with a terminal cap 164 secured to the fuse tube in any desired manner. Terminal cap 164 is provided with a substantially centrally located aperture for slidably receiving a plunger 166, the inner end of which is secured to the central portion of a flexible diaphragm 168. Flexible diaphragm 168, in the embodiment of the invention illustrated, is preferably made of a thin flexible metal, and is secured at its periphery to the side wall of terminal cap 164 in any desired manner, such, for example, as by soldering or the like. As shown, plunger 166 is provided with a reduced inner end portion extending through a central aperture in flexible diaphragm 168, and is secured to the diaphragm as by soldering or welding. Plunger 166 is maintained with the major portion thereof within fuse tube 162 and terminal cap 164, by conductor 170, which is secured to the inner end of the plunger. Conductor 170 may be of fusible material and connected to the lower terminal cap of fuse tube 162, or it may be connected to the strain element for a fusible member within the lower portion of fuse tube 162. A spirally coiled spring 172 has the outer coil thereof seated on the upper end of fuse tube 162, and the inner coil thereof closely surrounds the reduced extension of plunger 166 below diaphragm 168, to bias the central part of the diaphragm and plunger 166 in a direction upwardly, relative to the fuse tube.

It will be observed that the flexible diaphragm 168 seals the upper end of fuse tube 162, even when it is flexed to the position shown in Fig. 8. In the operation of this embodiment of the invention, when the fuse blows, conductor 170 is no longer effective to maintain plunger 166 at the position shown in Fig. 7, and spring 172 is thus freed to move plunger 166 and the diaphragm to the position shown in Fig. 8. With the plunger 166 at the position shown in Fig. 8, a readily visible indication is provided to indicate the blown condition of the fuse. The fuse shown in Figs. 7 and 8 may be mounted in the same manner as the fuse 126 shown in Figs. 5 and 6, with release lever 148 overlying top terminal cap 164 so as to be actuated to release the contact and latch mechanism 136 by movement of plunger 166 from the position shown in Fig. 7 to that shown in Fig. 8.

In Figs. 9 and 10, there is illustrated a fuse having a plunger 180 normally held in the retracted position shown in Fig. 9 and movable to the extended position shown in Fig. 10 upon blowing of the fuse to give a readily visible indication of the blown condition of the fuse, or for actuating release mechanism, such as the mechanism 136 shown in Figs. 5 and 6. The fuse 174 shown in Figs. 9 and 10 includes an outer tube 176 of insulation material having a top terminal cap 178 secured over the upper end thereof in any desired manner. Plunger 180 is adapted to slide through a central aperture provided in top terminal cap 178, and is provided at its inner end with an outwardly extending stop flange 182. A generally cup-shaped housing 184 has the open end thereof secured to terminal cap 178 within fuse tube 176 to form a housing for plunger 180. Plunger 180 is preferably of hollow construction for receiving a coiled compression spring 186 therein which normally acts to bias the plunger outwardly to the position shown in Fig. 10, wherein flange 182 on the plunger engages the cover to limit outward movement of the plunger beyond this position. Plunger 180 is normally held retracted in the position shown in Fig. 9 by low melting point solder 188 joining flange 182 to the bottom wall of housing 184. A second generally cup-shaped housing 190 is provided over the inner end of housing 184 for containing heat-producing material 192, which may be like the material 124 described above in connection with the embodiment of the invention shown in Fig. 4. A conductor 193, which may be like the conductor 120, also described in connection with the embodiment of the invention shown in Fig. 4, and may be connected in the same manner as conductor 120, is secured at its upper end to the bottom wall of housing 184 and extends through housing 190 and the heat-producing material therein to be connected to the terminal cap at the end of fuse tube 176.

In the operation of the embodiment of the invention shown in Figs. 9 and 10, it will be apparent that when conductor 193 is melted upon blowing of the fuse, an arc will be struck in proximity to heat-producing material 192 to heat the lower end wall of housing 184, and thereby melt solder 188 and release plunger 180 for movement by spring 186 to the position shown in Fig. 10. Here again, it will be noted that the fuse tube is completely closed at all times, but the plunger 180 provides a means for giving an external indication of the blown condition of the fuse, or for releasing a latch mechanism such as that disclosed in Figs. 5 and 6.

In Figs. 11 and 12, there is disclosed another modification of a means for providing an external indication for a fuse, while the fuse remains closed at all times, which means say, if desired, be used to operate a latch release mechanism of the type shown in Figs. 5 and 6. Fuse 194 shown in Figs. 11 and 12 includes an outer fuse tube 196 of insulating material, having a top terminal cap 198 secured thereto in any desired manner. A leaf spring 200 is secured to the outside of terminal cap 198 in any desired manner, such, for example, as by a rivet 202. Spring 200 is strained in a manner such that it will normally occupy the position shown in Fig. 12, but it is normally maintained against the outside of terminal cap 198, as shown in Fig. 11, by low melting point solder 204. Within fuse tube 196 in proximity with the inner surface of terminal cap 198 and located about the area occupied by solder 204 on the exterior of the terminal cap, there is provided a cup-shaped holder 208 for heat-producing material 210, similar to the material 124 and 192, previously described. Holder 208 is maintained in position by an integral extension 206 received between the end of fuse tube 196 and terminal cap 198. A conductor 212, similar to the conductors 120 and 193 previously described, extends through holder 208 and heat-producing material 210, to be secured to terminal cap 198.

The operation of the embodiment of the invention shown in Figs. 11 and 12 will be obvious, since it is much like that shown in Figs. 9 and 10. When conductor 212 melts to form an arc in proximity to heat-producing material 210, the heat therefrom will be conducted through terminal cap 198 to melt solder 204 and release the outer end of spring 200 and permit it to move to the position shown in Fig. 12. It will be observed that this structure comprises a fuse which is completely enclosed at all times, similar to the embodiments of the invention previously described.

In Figs. 13 and 14, there is shown a fuse construction much like that of Figs. 7 and 8, except that instead of using a flexible diaphragm, a flexible bellows-like arrangement is utilized to seal the upper end of the fuse. Fuse 214, like the fuse illustrated in Figs. 7 and 8, is provided with an outer supporting tube 216 of insulating material, having an upper end terminal cap 218 secured thereto in any desired manner. The terminal cap 218 is provided with a central aperture for slidably receiving a plunger 220 secured at its inner end to a plate 222. Plate 222 is biased upwardly by a coiled spiral spring 224, and the opening in terminal cap 218 is sealed by a flexible bellows-like member 228, secured to the terminal cap and to plate 222. Bellows 228 may be of any desired material, being shown as of metal, but it may be of other flexible material, such as rubber, fabric or the like. A conductor 226, similar to the conductor 170 previously described, is secured to the inner side of plate 222 for normally maintaining plunger 220 at the retracted inner position shown in Fig. 13.

In the operation of the embodiment of the invention shown in Figs. 13 and 14, when conductor 226 is released upon blowing of the fuse, spring 224 is released to move plunger 220 to the projecting position shown in Fig. 14. This movement of plunger 220 may be utilized to merely give a visual indication of the blown condition of the fuse, or, as in the embodiments of the invention shown in Figs. 5 to 12, may be utilized to release a latch mechanism, such as the mechanism 136 shown in Figs. 5 and 6, to enable fuse 214 to drop out of the circuit in response to blowing of the fuse.

The fuse structures shown in Figs. 15 to 17 are also of the totally enclosed type, which are capable of generating a predetermined pressure within the fuse enclosure upon circuit interruption, and may be mounted to drop out of the associated circuit in the same manner as the fuses shown in Figs. 1 to 3. The particular structures shown in Figs. 15 to 17, being similar to the structures shown in Figs. 1 to 3, like reference numerals have been used to designate like parts.

In Fig. 15 the fuse refill unit differs from that shown in Fig. 1 in that it includes a tubular metallic member 230, having an internally threaded upper end portion forming in the member 230 a shoulder 232, on which is seated a metallic supporting disk 234 of conducting material. The disk 234 is secured in position in tubular member 230 by means of an end closure plug 236, threadedly engaged in the upper end of tubular member 230, and having a reduced upwardly projecting portion 238, extending through aperture 26 in end terminal cap 9 of fuse tube 18. Projecting portion 238 is threaded to cooperate with the clamping member 28 for securing the refill unit in operative position within the fuse tube.

The lower portion of tubular member 230 is reduced as at 240 to provide a shoulder upon which is fitted a perforated partition member 242. The lower reduced end 240 of the tubular member is threaded into the upper end of an insulating throat member 244, which may be of any desired insulating material, such as fiber or the like. Tubular throat member 244 is provided with a substantially cylindrical bore 246 adjacent to, and forming an extension of the bore in reduced end 240 of tubular member 230. The outer end of throat member 244 is provided with an outwardly flared exterior portion 248.

An insulating tube 250 is positioned in a central aperture through perforated end closure 242; and extends upwardly within tubular member 230, to a position spaced from supporting disk 234, for receiving a high-resistance fusible wire 252 therein. The wire 252, which may be of any desired high-resistance fusible material, such as a nickel-chrome alloy, or the like, has its upper end anchored to supporting disk 234, and its lower end secured in a conducting sleeve 254, which sleeve is, in turn, connected to the upper end of flexible conductor 38.

Within the upper end of tubular member 230, there is provided gas generating material 256 which may be gun powder or similar combustible material, which is adapted to evolve relatively large quantities of gas upon combustion. In the lower portion of tubular member 230, and separated from gas generating material 256, as by a metal screen 258, there is provided cooling means 260, which may be in the form of metal shavings or a gas evolving material which is capable of evolving relatively cool unionized gases when subjected to heat, such for example, as boric acid, fiber, synthetic resins or the like, or a combination of such materials. The sleeve 254 mounted on the upper end of flexible conductor 38 is connected to the reduced portion 240 of the tubular member by means of a short section 262 of a calibrated, relatively low-resistance, fusible wire.

In operation, when the current through the fuse exceeds a value predetermined by the short fusible section 262, this fusible section will melt and the current through the fuse will be transferred to the high-resistance fusible wire 252. Wire 252, in turn, will melt practically instantaneously, and the arc formed will ignite gas generating material 256.

Gases generated by explosive or semi-explosive material usually have a high temperature and, therefore, in passing downwardly through cooling material 260, these gases will be cooled and escape through perforated end closure 242, into passage 246 and thence into the lower end of fuse tube 18. After the high-resistance fuse wire 252 has melted, the arc will obviously be reestablished between sleeve 254 on the upper end of flexible conductor 38 and the closely adjacent portion 240 of tubular member 230. The gases then, in passing downwardly through the fuse, will pass through this arc and expel the upper end of conductor 38 from passage 246. This action not only extinguishes the arc upon circuit interruption, but builds up pressure in the lower portion of fuse tube 18, which will rise to a predetermined value, since a predetermined amount of combustible material 256 will be consumed, and this pressure will cause outward movement of piston 58 in the same manner as in the embodiment of the invention shown in Fig. 2.

After the fuse has blown, it may be refilled in substantially the same manner as the fuse shown in Fig. 1, by merely replacing the refill unit held in position by clamping disk 28. It will be noted that the fuse shown in Fig. 15 is totally enclosed before, during, and after circuit interruption, and that a predetermined force is available for actuating piston member 58 outwardly when the fuse blows, irrespective of the value of current interrupted.

The fuse shown in Fig. 16 is similar to that shown in Fig. 15, except for minor variations. The tubular member 230 of the refill unit in Fig. 16 is quite similar to that shown in Fig. 15, except that it is provided with an integral perforated bottom wall, having an interiorly depending, centrally positioned electrode 264, extending beyond the lower end of reduced portion 240 of the tubular member. An insulating throat member 266 is threaded on extension 240, and the throat member is provided with a restricted portion intermediate its ends, which may be formed by an insert 268, threadedly mounted within throat member 266. The inner contour of the throat member flares outwardly from insert 268 to provide a Venturi passage similar to the passage through throat member 244, shown in Fig. 15. Insert 268 is preferably of some heat resistant material and may be either of metal or an insulating material. Electrode 264 is connected to the upper end of conductor 38 by a short calibrated fusible section 270. Electrode 264 is also provided with a central, longitudinally extending bore in which is received an insulating sleeve 272, similar to the tube 250 described in connection with Fig. 15, for receiving a relatively high-resistance fusible strain wire 274. Tubular member 230, in this embodiment of the invention, contains gas generating material 256 and cooling material 260 as in the embodiment of the invention shown in Fig. 15.

The operation of the fuse shown in Fig. 16 is much like that described in connection with the fuse shown in Fig. 15, and, therefore, will not be repeated in detail. The main difference in operation of this fuse resides in the fact that the gas blast during circuit interruption is directed peripherally around arcing electrode 264. Since the arc will be drawn between electrode 264 and sleeve 254 on the upper end of conductor 38, the gases will be directed around the electrode 264; and then converge through the restricted portion of the arc passage provided by insert 268, and then may expand outwardly in the flared portion of the passage, through throat member 266.

In Fig. 17 there is illustrated a fuse, similar to those of Figs. 15 and 16, but differing therefrom in that the fuse elements proper are remote from the point at which the arc is finally struck and extinguished, and in that the gases generated also operate to separate the arcing terminals to lengthen the arc. Since many of the parts of the fuse shown in Fig. 17 are identical with the parts of the fuse shown in Figs. 15 and 16, like reference numerals will be used to designate such like parts.

The fuse refill unit, as in the two previously described embodiments of the invention, includes a tubular member 230, having gas generating material 256 and cooling means 260 therein. However, in this embodiment of the invention, an end closure plug 276 is provided for tubular member 230, and the plug is provided with an interiorly threaded aperture for receiving an insulating screw 278 for securing end fitting 280 to the tubular member in insulated relation therewith. An insulating washer 282 is provided between fitting 280 and closure plug 276 to electrically isolate these parts. Fitting 280 is provided with an integral extension 284, adapted to be received in the opening 26 in end terminal cap 9 for cooperation with clamping disk 28, to detachably secure the refill unit in proper position within fuse tube 18. Fitting 280 and insulating screw 278 are provided with aligned, substantially central bores for the reception of high-resistance fusible wire 286, having its upper end secured to the upper end of projection 284 of fitting 280, and having its lower end extending through gas generating material 256 to be secured to tubular member 230. A calibrated low-resistance fuse wire section 288 connects fitting 280 with closure plug 276 to provide a circuit in parallel with the high-resistance fuse wire 286. The reduced lower end 240 of the tubular member is provided with an insulating throat member 244, and flexible conductor 38 has the end sleeve 254 thereof received in an aperture in the base of a generally cup-shaped contact member 290. Contact 290 may be formed of any desired resilient conducting material, with the sides thereof split to provide resilient contact fingers for engaging the inner walls of the central bore through extension 240 of tubular member 230. It will be observed that contact 290 substantially closes the gas passage-way through the lower end of tubular member 230 and is frictionally retained at such a position by the engagement of the spring contact fingers with extension 240.

In operation, the fuse shown in Fig. 17 performs similarly to those illustrated in Figs. 15 and 16 in that the circuit is first opened by melting of fusible section 288 to thereby transfer the current to fusible wire 286. Wire 286 then melts, thereby igniting gas generating material 256, which builds up a predetermined gas pressure within tubular member 230. This pressure is predetermined by the amount of gas generating material used to be of a value sufficiently high to force cup-shaped terminal 290 downwardly through the passage in extension 240 and insulating throat member 240, to interrupt the circuit in the fuse, and establish a predetermined pressure within the lower portion of fuse tube 18.

It will be noted that in the embodiments of the invention shown in Figs. 15 to 17, there is disclosed different means for providing a predetermined pressure within a totally enclosed fuse holder, entirely independent of the value of current interrupted, so that a constant force is provided for moving a means, such as piston 58 shown in Figs. 2 and 15, outwardly relative to the fuse holder, to provide a readily visible indication of the blown condition of the fuse at the exterior thereof. Moreover, such outward movement of piston 58 may be utilized, as in the embodiment of the invention shown in Figs. 2 and 3 for releasing a means holding the fuse holder in engagement with line contact terminals so that the fuse holder will automatically be released from at least one of its line terminals to drop out of its associated circuit in response to a circuit interrupting operation.

The fuse structures illustrated in Figs. 15 to 17 are more particularly described and claimed, per se, in my previously mentioned patent.

In view of the foregoing, it will be apparent that there is disclosed herein a plurality of modifications of totally enclosed fuses which are adapted to drop out of the circuit in response to blowing of the fuses and remain totally enclosed at all times, before, during, and after interruption occurs within the fuse. In all of the modifications of the invention, a predetermined force is available to release the mechanism holding a dropout fuse in circuit, and this force is entirely independent of the value of current interrupted. All of the modified forms of fuses disclosed herein, with the exception of that shown in Fig. 1, are normally sealed from the atmosphere and remain sealed during and after blowing of the fuse. Furthermore, at least the modifications of the invention shown in Figs. 5 to 17 may, if desired, be used without dropout mechanisms such as that shown in Figs. 1 to 3, 5 and 6, in which case they will serve to provide a readily visible indication of the blown condition of the fuses. Various means are disclosed for releasing dropout mechanisms to enable the fuse to drop out of the circuit, including piston or diaphragm members actuated by spring means or fluid pressure-responsive means, as well as constructions utilizing the transmission of heat through a fuse terminal cap to release a visual indicator which may be also used to release the mechanism holding the fuse in circuit to obtain dropout action.

Having described preferred embodiments of the invention in accordance with the patent statutes, it is desired that the invention be not limited to these particular structures, inasmuch as it will be apparent, particularly to persons skilled in the art, that many changes and modifications may be made in these structures without departing from the broad spirit and scope of this invention. Accordingly, it is desired that the invention be interpreted as broadly as possible, and that it be limited only as required by the prior art.

I claim as my invention:

1. In a fuse including a substantially closed fuse tube having a pair of terminals thereon, fusible means connecting said terminals, and means responsive to fusion of said fusible means for creating fluid pressure in said tube; the combination of a supporting lever pivoted intermediate its ends on said tube, said lever having a supporting pivot element adjacent one end thereof, means engaging the other end of said lever for normally preventing movement of said lever, a rigid piston-like member slidably extending through an aperture in a wall of said tube and movable outwardly in response to pressure in said tube for releasing said lever for movement, whereby upon fusion of said fusible means the fluid pressure developed in said tube acts to expel said piston-like member.

2. In a fuse including a substantially closed fuse tube having a pair of terminals thereon, fusible means connecting said terminals, and means responsive to fusion of said fusible means for creating fluid pressure in said tube; the combination of a supporting lever pivoted intermediate its ends on said tube, said lever having a supporting pivot element adjacent one end thereof, means engaging the other end of said lever for normally preventing movement of said lever, a rigid piston-like member slidably extending through an aperture in a wall of said tube and movable outwardly in response to pressure in said tube for releasing said lever for movement, whereby upon fusion of said fusible means the fluid pressure developed in said tube acts to expel said piston-like member, and stop means on said member to limit its outward movement.

3. In a fuse including a substantially closed fuse tube having a pair of terminals therein, fusible means connecting said terminals, and means responsive to fusion of said fusible means for creating fluid pressure in said tube; the combination of a supporting lever pivoted intermediate its ends on said tube, said lever having a supporting pivot element adjacent one end thereof, latch means for preventing pivotal movement of said lever with respect to said tube, and means responsive to the pressure developed in said tube upon fusion of said fusible means for releasing said latch means.

4. In a fuse including a substantially closed fuse tube having a pair of terminals therein, fusible means connecting said terminals, and means responsive to fusion of said fusible means for creating fluid pressure in said tube; the combination of a supporting lever pivoted intermediate its ends on said tube, said lever having a supporting pivot element adjacent one end thereof, means engaging the other end of said lever for normally preventing movement of said lever, a rigid piston-like member slidably extending through an aperture in a wall of said tube and movable outwardly in response to pressure in said tube for releasing said lever for movement, means for releasably supporting said tube in engagement with line contacts including a pivot support for said lever pivot element, and latching means engaging the tube at a point spaced from said pivot support, whereby upon fusion of said fusible means the pressure developed in said tube forces said piston-like member outwardly to release said lever for movement relative to said tube and pivot support to move said tube relative to said latching means to disengage the same and permit movement of said tube out of engagement with respect to at least one of said line contacts.

5. In a fuse, a substantially closed fuse tube having a pair of terminals, fusible means for striking an arc in said tube, means in said tube capable of supplying predetermined relatively large quantities of gas independent of the current magnitude of said arc, at least a portion of said fusible means positioned to initiate gas evolution by said gas supplying means upon fusion of said fusible means, a supporting lever pivoted intermediate its ends on said tube, said lever having a supporting pivot element adjacent one end thereof, means engaging the other end of said lever for normally preventing relative movement thereof, a rigid piston-like member slidably extending through an aperture in a wall of said tube and normally maintained at an inner position, said piston-like member being slidable outwardly of said tube to release said lever, said piston-like portion positioned in said tube to be subjected to said evolved gases after their passage through said arc, whereby upon fusion of said fusible means the pressure developed in said tube acts to expel said piston-like portion and release said lever irrespective of the current value of said arc.

6. In a fuse, a substantially closed fuse tube having a pair of terminals, fusible means for striking an arc in said tube, means in said tube capable of releasing predetermined relatively large quantities of gas independent of the current magnitude of said arc, at least a portion of said fusible means positioned to initiate gas evolution by said gas evolving means upon fusion of said fusible means, a supporting lever pivoted intermediate its ends on said tube, said lever having a supporting pivot element adjacent one end thereof, means engaging the other end of said lever for normally preventing relative movement thereof, a rigid piston-like member slidably extending through an aperture in a wall of said tube and normally maintained at an inner position, means for releasably supporting said tube in engagement with line contacts including a pivot support for said lever pivot element, and latching means engaging the tube at a point spaced from said pivot support, said piston-like portion positioned in said tube to be acted on by said evolved gases after their passage through said arc, whereby upon fusion of said fusible means the pressure developed in said tube expels said piston-like member to release said lever for movement relative to said tube and pivot support, and said tube moves relative to said latching means to disengage the same and permit movement of said tube out of engagement with respect to at least one of said line contacts a predetermined time after fusion of said fusible means, and irrespective of the current value of said arc.

7. In a fuse, a fuse tube having closed ends and spaced terminals thereon, conducting means in said tube connecting said terminals, said conducting means including a fusible element, means in said tube responsive to fusion of said fusible element for independently releasing a predetermined quantity of arc extinguishing gas irrespective of the current magnitude of the arc to extinguish the arc, and pressure-responsive means movably mounted on said tube and exposed to the interior of said tube so as to be moved outwardly relative to said tube in response to pressure built up in said tube by production of said predetermined quantity of gas.

8. In a fuse, spaced line contacts, a fuse tube having closed ends and spaced terminals thereon, releasable means normally maintaining said tube in a position wherein said terminals engage said contacts, respectively, conducting means in said tube connecting said terminals, said conducting means including a fusible element, means in said tube responsive to fusion of said fusible element for independently releasing a predetermined quantity of arc extinguishing gas irrespective of the current magnitude of the arc, and pressure-responsive means movably mounted on said tube so as to be moved outwardly relative to said tube in response to pressure built up in said tube by production of said predetermined quantity of gas to release said releasable means and permit movement of at least one of said fuse terminals away from its corresponding contact.

9. In a fuse including a substantially closed fuse tube having a pair of terminals therein, fusible means connecting said terminals, and means responsive to fusion of said fusible means for creating fluid pressure in said tube; the combination of a supporting lever pivoted intermediate its ends on said tube, said lever having a supporting pivot element adjacent one end thereof, latch means for preventing pivotal movement of said lever with respect to said tube, means responsive to the pressure developed in said tube upon fusion of said fusible means for releasing said latch means, and said pressure responsive means being movable relative to said fuse tube to release said latch means without opening said tube to the atmosphere.

10. In a fuse including a substantially closed fuse tube having a pair of terminals therein, fusible means connecting said terminals, and means responsive to fusion of said fusible means for creating fluid pressure in said tube; the combination of a supporting lever pivoted intermediate its ends on said tube, said lever having a supporting pivot element adjacent one end thereof, latch means for preventing pivotal movement of said lever with respect to said tube, a piston member slidably mounted in a cylindrical aperture in said fuse tube so as to be movable in response to pressure developed in said tube upon fusion of said fusible means to release said latch means, and means preventing escape of said piston member from said aperture.

11. In a fuse, spaced line contacts, a fuse tube having closed ends and spaced terminals thereon, releasable means normally maintaining said tube in a position wherein said terminals engage said contacts, respectively, conducting means in said tube connecting said terminals, said conducting means including a fusible element, said fuse tube having a flexible wall portion responsive to fusion of said fusible means to move outwardly relative to said tube without opening said tube to the atmosphere, and said releasable means positioned to be engaged by said fusion responsive means upon outward movement thereof to release said tube and permit movement thereof to disengage at least one of said fuse terminals from its corresponding line contact.

12. In a dropout fuse, spaced line contacts, a movably mounted fuse tube having closed ends and spaced terminals thereon, latch means for maintaining said tube in a position wherein said terminals engage said contacts, respectively, conducting means including a fusible element in said tube and connected between said terminals, a plunger member limitedly slidably mounted in an opening in one end wall of said tube, flexible sealing means connecting said plunger member to walls of said tube surrounding said opening so that said plunger is movable relative to said tube without opening said tube to the atmosphere, and means responsive to fusion of said fusible element for moving said plunger member outwardly to release said latch means and permit movement of said tube to disengage at least one of said terminals from its corresponding contact.

13. In a dropout fuse, spaced line contacts, a movably mounted fuse tube having closed ends and spaced terminals thereon, latch means for maintaining said tube in a position wherein said terminals engage said contacts, respectively, conducting means including a fusible element in said tube and connected between said terminals, a piston member limitedly slidably mounted in a cylindrical opening in one end wall of said tube so as to be movable without opening said tube to the atmosphere, resilient means biasing said piston member outwardly relative to said tube, means normally restraining movement of said piston member under the influence of said resilient means, and means responsive to fusion of said fusible element to release said piston member for movement to release said latch means and permit movement of said tube to disengage at least one of said terminals from its corresponding contact.

14. In a fuse, a fuse tube, end terminal closures for said tube, conducting means including a fusible element in said tube connected between said terminal closures, means movably supported by one of said terminal closures and normally held in a predetermined position by fusible material secured to a heat conducting portion of said one terminal closure, and means located within said tube adjacent said one terminal closure for generating a predetermined amount of heat in response to fusion of said fusible element, to melt said fusible material and release said movable means for movement relative to said tube.

15. In a fuse, a fuse tube, end terminal closures for said tube, conducting means including a fusible element in said tube connected between said terminal closures, means movably supported by one of said terminal closures and normally held in a retracted position by fusible material secured to a heat conducting portion of said one terminal closure, and means located within said tube adjacent said one terminal closure for generating a predetermined amount of heat in response to fusion of said fusible element to melt said fusible material and release said movable means for movement away from said tube.

16. In a fuse, a fuse tube, end terminal closures for said tube, conducting means including a fusible element in said tube connected between said terminal closures, outwardly biased means movably supported by one of said terminal closures and normally held in a retracted position by fusible material secured to a heat conducting portion of said one terminal closure, and means located within said tube adjacent said one terminal closure for a predetermined amount of generating heat in response to fusion of said fusible element to melt said fusible material and release said movable means for movement away from said tube.

17. In a fuse, a fuse tube, end terminal closures for said tube, conducting means including a fusible element in said tube connected between said terminal closures, means movably supported by one of said terminal closures and normally held in a retracted position by said fusible element, means biasing said movable means outwardly relative to said tube, said one closure having an aperture through which said movable means can move in response to fusion of said fusible element, and flexible sealing means connected to said movable element for sealing said closure aperture at all times.

18. In a fuse, a fuse tube, end terminal closures for said tube, conducting means including a fusible element in said tube connected between said terminal closures, means movably supported by one of said terminal closures and normally held in a retracted position in said tube by said fusible element, means biasing said movable means outwardly relative to said tube, said one closure having an aperture through which said movable means can move in response to fusion of said fusible element to a projecting position with respect to said tube, and flexible sealing means connected to said movable element for sealing said closure aperture at all times.

19. In a circuit interrupter, a tubular fuse holder, a fusible circuit interrupting means in said holder, an actuating member movably mounted at one end of said holder, means normally holding said member at a retracted position, means for causing outward movement of said member, and means responsive to fusion of said circuit interrupting means for releasing said holding means and causing said actuating means to move said member.

20. In a circuit interrupter, a tubular fuse holder, fusible circuit interrupting means in said holder, an actuating member movably mounted at one end of said holder, means independent of said circuit interrupting means normally holding said member at a retracted position, means for causing outward movement of said member, and means responsive to fusion of said circuit interrupting means for causing said actuating means to move said member.

21. In a high voltage circuit interrupting device having an interrupting element with a fusible section, a plunger, actuating means for said plunger and means operatively connected to said fusible section for causing said actuating means to move said plunger upon the fusing of said section.

22. In a circuit interrupting device having fusible circuit interrupting means, a movable indicating and tripping element, means independent of said interrupting means normally preventing movement of the element, combustible means for destroying said holding means, and means responsive to fusion of said interrupting means for igniting said combustible means.

23. In a fuse, a fuse tube having closed ends and spaced terminals thereon, conducting means in said tube connecting said terminals and including a fusible portion, said tube having an opening at one end, a flexible bellows member secured at one end to said tube about said opening for sealing said opening so that the other end of said bellows member is movable to extended and retracted positions, means dependent upon the continuity of said fusible portion for holding said bellows member at one of its positions, whereby said bellows member is freed to move to the other of its positions in response to fusion of said fusible portion.

HERBERT L. RAWLINS.

REFERENCES CITED

The following references are of record in the file of this patent:

UNITED STATES PATENTS

| Number | Name | Date |
| --- | --- | --- |
| 2,200,608 | Triplett | May 14, 1940 |
| 2,226,838 | Triplett | Dec. 31, 1940 |
| 2,310,069 | Fahnoe | Feb. 21, 1943 |
| 2,315,678 | Wallace | Apr. 6, 1943 |